(12) United States Patent
Nishimura et al.

(10) Patent No.: US 6,677,074 B2
(45) Date of Patent: *Jan. 13, 2004

(54) CELL AND METHOD OF PRODUCING THE SAME

(75) Inventors: Takashi Nishimura, Tokyo (JP); Makiko Kise, Tokyo (JP); Syoji Yoshioka, Tokyo (JP); Jun Aragane, Tokyo (JP); Hiroaki Urushibata, Tokyo (JP); Hisashi Shiota, Tokyo (JP); Shigeru Aihara, Tokyo (JP); Daigo Takemura, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/485,684

(22) PCT Filed: Jun. 25, 1998

(86) PCT No.: PCT/JP98/02860

§ 371 (c)(1),
(2), (4) Date: Feb. 25, 2000

(87) PCT Pub. No.: WO99/67841

PCT Pub. Date: Jun. 25, 1998

(65) Prior Publication Data

US 2003/0129478 A1 Jul. 10, 2003

(51) Int. Cl.[7] ........................... H01M 10/50; H01M 4/72
(52) U.S. Cl. .......................................... 429/62; 429/234
(58) Field of Search ............................ 429/213, 231.95, 429/231.9, 218.1, 62, 234

(56) References Cited

U.S. PATENT DOCUMENTS

| 3,944,432 | A |   | 3/1976  | Brinkmann et al. ........... 136/63 |
| 4,416,915 | A |   | 11/1983 | Palmer et al. ............ 427/126.3 |
| 5,415,948 | A |   | 5/1995  | Gauthier et al. ............... 429/62 |
| 5,538,814 | A | * | 7/1996  | Kamauchi et al. ........... 429/218 |
| 5,541,022 | A | * | 7/1996  | Mizumoto et al. ........... 429/218 |
| 5,542,163 | A |   | 8/1996  | Chang .............................. 29/2 |
| 5,599,564 | A |   | 2/1997  | Ishihara et al. .............. 425/190 |
| 5,705,259 | A |   | 1/1998  | Mrotek et al. ............... 428/209 |
| 5,856,773 | A |   | 1/1999  | Chandler et al. ............. 338/22 |
| 6,306,540 | B1|   | 10/2001 | Hiroi et al. |
| 6,346,345 | B2| * | 2/2002  | Shiota et al. .................. 429/62 |

FOREIGN PATENT DOCUMENTS

JP          61-74257          4/1986

(List continued on next page.)

*Primary Examiner*—Patrick Ryan
*Assistant Examiner*—Julian Mercado
(74) *Attorney, Agent, or Firm*—Oblon, Spivak, McClelland, Maier & Neustadt, P.C.

(57) ABSTRACT

Conventional batteries have a problem that, in case the battery temperature should rise to 100° C. or higher due to an internal short-circuit, etc., a large short-circuit current develops to generate heat. It follows that the battery temperature further increases, which can result in a further increase of the short-circuit current. Further, some of electrode structures involve reduction in discharge capacity. These problems are solved by a battery in which an electron conductive material (9), being in contact with an active material (8) in an electrode, comprises a conductive filler and a resin so that the electrode may increase its resistivity with a temperature rise, and the ratio of the particle size of the electron conductive material (9) to that of the active material (8) is in a range of from 0.1 to 20.

14 Claims, 9 Drawing Sheets

FOREIGN PATENT DOCUMENTS

| | | | |
|---|---|---|---|
| JP | 1-197963 | | 8/1989 |
| JP | 4-58455 | | 2/1992 |
| JP | 5-74493 | | 3/1993 |
| JP | 6-231749 | | 8/1994 |
| JP | 7-161389 | | 6/1995 |
| JP | 07220755 | * | 8/1995 |
| JP | 7-220755 | | 8/1995 |
| JP | 8-306354 | | 11/1996 |
| JP | 9-213305 | | 8/1997 |
| JP | 10-106516 | | 4/1998 |
| JP | 10-241665 | | 9/1998 |

* cited by examiner

CELL AND METHOD OF PRODUCING THE SAME

TECHNICAL FIELD

This invention relates to a battery and a method of fabricating thereof. More particularly, it relates to a battery which secures safety while retaining high discharge capacity by suppressing a temperature rise due to a short-circuit, etc. and a method of fabricating thereof.

BACKGROUND OF THE INVENTION

In recent years, with the development of electronic equipment, batteries used therein as a power source have increasingly gained in capacity and output density. A lithium ion secondary battery is attracting attention as a battery fulfilling these requirements. A lithium ion secondary battery has an advantage of high energy density but requires sufficient measures for safety because of use of a nonaqueous electrolytic solution.

Conventionally proposed safety measures include a safety valve which relieves an increased inner pressure and a PTC element which increases resistivity on heat generation due to an external short-circuit to shut off the electric current. For example, incorporation of a safety valve and a PTC element into the cap of a positive electrode of a cylindrical battery is known as disclosed in JP-A-4-328278. However, on the safety valve's working, moisture in the air enters the inside of the battery, which can induce an exothermic reaction in case lithium exists in the negative electrode.

On the other hand, a PTC element, which cuts off the external circuit involving a short-circuit, exerts no bad influence on operating. The PTC element can be designed to operate when the battery temperature rises to, for example, 90° C. or higher due to an external short-circuit so as to be the first safety element to operate in case of abnormality.

Figure 9:
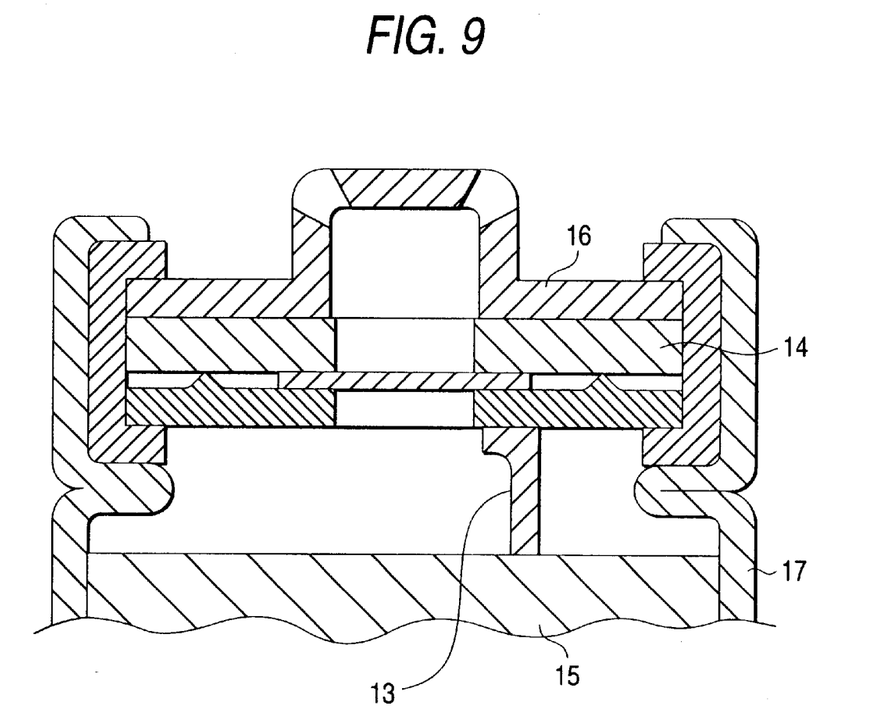
FIG. 9 is a schematic cross sectional view explaining a conventional battery.

FIG. 9 shows an example of conventional lithium secondary batteries with a PTC element having the above-described constitution. Having the structure illustrated in the Figure, conventional lithium secondary batteries involve the following problems. As shown in the Figure, a conventional lithium secondary battery has a PTC element 14 in the cap part (the part having a safety valve 16) fitted on the top of a case 17. In case where a short-circuit occurs inside the battery, i.e., in the electrode 15 deeper than a lead 13, and the battery temperature rises due to the short-circuit, the PTC element 14 is incapable of suppressing the increase in the short-circuit current.

When a short-circuit occurs in the inside of a lithium secondary battery to raise temperature, a separator made of polyethylene or polypropylene interposed between a positive electrode and a negative electrode is expected to soften or melt to clog the pores of the separator, whereby the separator would exude the nonaqueous electrolytic solution contained therein or seal the nonaqueous electrolytic solution within itself to reduce its ion conductivity thereby to diminish the short-circuit current. However, the part of the separator distant from the heat generating part does not always melt. Besides, in case temperature rises, it is likely that the separator melts and flows to lose its function of electric insulation between positive and negative electrodes, which can lead to a short-circuit.

In particular, in the case of a lithium ion secondary battery, the negative electrode is prepared by coating a substrate functioning as a current collector, such as copper foil, with a slurry comprising a negative electrode active material such as graphite, a binder such as polyvinylidene fluoride (PVDF), and a solvent, and drying the coating layer to form a film. The positive electrode is similarly prepared in a film format on a substrate functioning as a current collector, such as aluminum foil, comprising a positive electrode active material, such as $LiCoO_2$, a binder, and a conducting agent. The conducting agent is to enhance electron conductivity of the positive electrode in case where the active material has poor electron conductivity. The conducting agent to be used includes carbon black (e.g., acetylene black) and graphite (e.g., artificial graphite KS-6, produced by Lonza).

When the temperature of such a battery increases to or above the temperature at which the separator melts and flows due to, e.g., an internal short-circuit, a large short-circuit current flows between the positive and negative electrodes at the part where the separator flows as mentioned above. It follows that the battery temperature further increases by heat generation, which can result in a further increase of the short-circuit current.

The invention has been made in order to solve the above-described problems. An object of the invention is to provide a battery which secures safety while retaining high discharge capacity and a method of fabricating thereof by using an electrode capable of suppressing an increase of a short-circuit current.

DISCLOSURE OF THE INVENTION

A first battery according to the invention is a battery having an active material layer comprising an active material and an electron conductive material in contact with the active material and an electrolyte layer joined to the active material layer, which is characterized in that the electron conductive material contains a conductive filler and a resin and is constituted so as to increase its resistivity with a rise in temperature, and the average particle size of the active material is 0.1 to 20 times that of the electron conductive material. According to this aspect, there is obtained a high-performance and highly safe battery which is capable of suppressing an increase in current flowing through the electrode in case of a temperature rise.

A second battery according to the invention is the above-described first battery, characterized in that the resin comprises a crystalline resin. The resin comprising a crystalline resin according to this aspect, the rate of increase in resistivity (i.e., the rate of change in resistivity) with temperature can be heightened so that there is provided a battery which can quickly suppress an increase in current flowing through the electrode in case of a temperature rise.

A third battery according to the invention is the above-described first battery, characterized in that the electron conductive material has an average particle size ranging from 1 $\mu$m to 10 $\mu$m. The particle size of the electron conductive material ranging from 1 to 10 $\mu$m, the electrode shows an increased rate of change in resistivity in case of a temperature rise while having a reduced resistivity in its normal state so that a battery having the electrode can have an increased discharge capacity.

A fourth battery according to the invention is the above-described first battery, characterized in that the weight ratio of the electron conductive material to the active material ranges from 0.06 to 0.15. With the electron conductive material to active material weight ratio ranging from 0.06 to 0.15, it is possible to desirably adjust the resistivity of the electrode before the rate of resistivity change increases and the discharge capacity.

A fifth battery according to the invention is the above-described first battery, characterized in that the resin has a melting point ranging from 90° C. to 160° C. According to this aspect, since a resin having a melting point of 90 to 160° C. is used, the electron conductive material shows an increased rate of resistivity change at around a predetermined temperature within a range of from 90 to 160° C. thereby achieving security consistent with battery characteristics.

A sixth battery according to the invention is the above-described first battery, characterized in that the proportion of the conductive filler in the electron conductive material is 40 to 70 parts by weight. The conductive filler content in the electron conductive material ranging from 40 to 70 parts by weight, the electrode shows an increased rate of change in resistivity in case of a temperature rise while having a reduced resistivity in its normal state, and the battery has an increased discharge capacity.

A seventh battery according to the invention is the above-described first battery, characterized in that the conductive filler is a carbon material or a conductive non-oxide. Containing a carbon material or a conductive non-oxide as a conductive filler, the electrode has enhanced conductivity.

An eighth battery according to the invention is the above-described first battery, characterized in that the active material layer contains a conducting agent. Since the electrode contains a conducting agent, the resistivity of the electrode can be properly adjusted even in using an electron conductive material having low electron conductivity.

A first method of fabricating a battery according to the invention is characterized by comprising the steps of:

(a) pulverizing an electron conductive material containing a conductive filler and a resin to prepare fine particles of the electron conductive material the average particle size of which is 0.05 to 10 times that of an active material, (b) dispersing the fine particles of the electron conductive material and the active material in a dispersing medium to prepare an active material paste, (c) pressing the active material paste having being dried at a prescribed temperature under a prescribed pressure to form an electrode, and (d) laying the resulting electrode and an electrolyte layer together.

Comprising the steps (a) to (d), the process provides a battery which retains a high discharge capacity and is capable of suppressing an increase in current flowing through the electrode in case of a temperature rise.

A second method of fabricating a battery according to the invention is the first process which is characterized in that the resin comprises a crystalline resin. According to this aspect, since the resin comprises a crystalline resin, the rate of increase in resistivity (i.e., the rate of change in resistivity) with temperature can be heightened so that there is provided a battery which can quickly suppress an increase in current flowing through the electrode in case of a temperature rise.

BEST MODE FOR CARRYING OUT THE INVENTION

Figure 1:
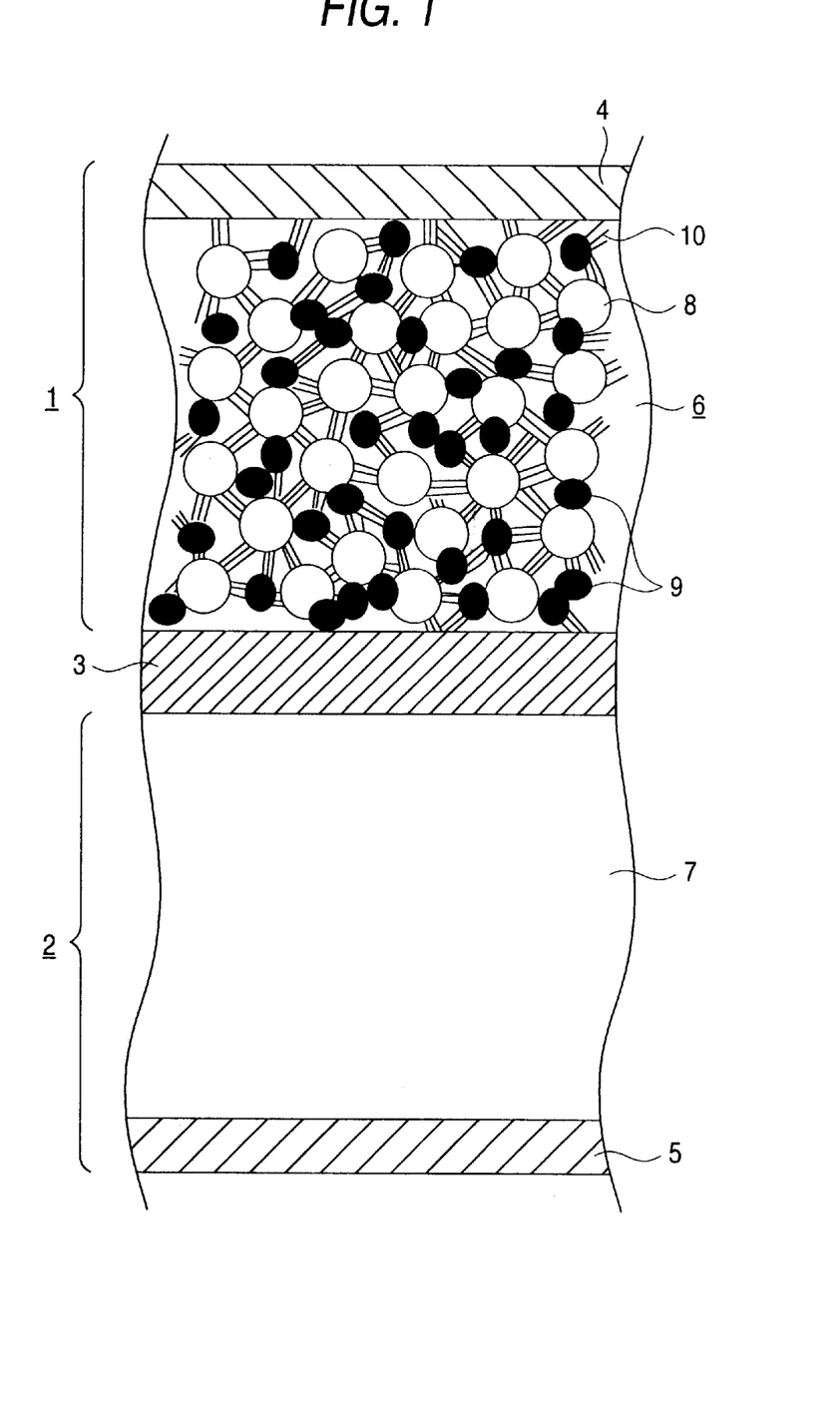
FIG. 1 is a schematic cross section for explaining the structure of the battery of the invention.

FIG. 1 is a section for explaining the structure of the battery according to the invention. More specifically, it is a cross-sectional view of the battery. In FIG. 1, numeral 1 indicates a positive electrode having a positive electrode active material layer 6 formed on the surface of a positive electrode current collector 4. Numeral 2, a negative electrode having a negative electrode active material layer 7 formed on the surface of a negative electrode current collector 5. Numeral 3, an electrolyte layer, such as a separator, provided between the positive electrode 1 and the negative electrode 2. The separator 3 holds an electrolytic solution containing, for example, lithium ions. It holds an ion-conducting solid polymer in a solid polymer type lithium battery or an ion-conducting gel polymer in a gel electrolyte type lithium battery.

The positive electrode active material layer 6, being formed on the surface of a current collector 4 comprising a metal film (e.g., an aluminum film), is made up of a positive electrode active material 8 and an electron conductive material 9 bound together by a binder 10. The electron conductive material 9 comprises a conductive filler and a resin or a crystalline resin and has such characteristics that the rate of change in resistivity with temperature increases (hereinafter the characteristics will be referred to as PTC (positive temperature coefficient)).

The positive electrode active material 8 is particles that may be either primary particles like single crystals or secondary particles, i.e., agglomerates of primary particles.

The positive electrode active material 8 to be used is 0.1 to 20 times as large as the electron conductive material 9 in average particle size. The electron conductive material 9 can be fibrous or flaky particles. The average particle size of the positive electrode active material 8 being 0.1 to 20 times that of the electron conductive material 9, the battery is capable of suppressing an increase in current in case of a temperature rise while retaining a high discharge capacity. In particular, where the particle size of the electron conductive material 9 falls within a range of from 1 to 10 μm while satisfying the above-mentioned relationship to the active material 8 in average particle size, further enhanced effects can result.

It is preferred for the resin to contain a crystalline resin to bring about improvement in the PTC characteristics hereinafter described (i.e., to increase the rate of change in resistivity).

The electron conducive material 9 possesses the characteristics that the rate of change in its resistivity increases in a temperature range of, for example, from 90 to 160° C. The PTC function of the electron conductive material 9 is manifested because the resin or the crystalline resin contained therein softens or melts to expand thereby to increase its own resistivity.

The conductive filler includes, for example, carbon materials and conductive non-oxides. The carbon materials include carbon black, such as acetylene black, furnace black, and lamp black, graphite, and carbon fiber. The conductive non-oxides include metal carbides, metal nitrides, metal silicides, and metal borides. The metal carbides include TiC, ZrC, VC, NbC, TaC, $Mo_2C$, WC, $B_4C$, and $Cr_3C_2$. The metal nitrides include TiN, ZrN, VN, NbN, TaN, and $Cr_2N$. The metal borides include $TiB_2$, $ZrB_2$, $NbB_2$, $TaB_2$, CrB, MoB, and WB.

The resin and crystalline resin are polymers, such as high-density polyethylene (melting point: 130 to 140°), low-density polyethylene (melting point: 110 to 112° C.), a polyurethane elastomer (melting point: 140 to 160° C.), and polyvinyl chloride (melting point: about 145° C.). The melting point of these resins is in a range of from 90° to 160° C.

Because the temperature at which the PTC function is activated is dependent on the melting point of the resin or crystalline resin contained in the electron conductive material 9, the temperature at which the PTC function is manifested can be set within a range of from 90° to 160° C. by selecting the resin material to be used.

The PTC characteristics may be either reversible so that a temperature drop after manifestation of the PTC function is followed by restoration of the initial resistivity, or irreversible.

If the electron conductive material performs its PTC function at or below 90° C., which is favorable for security, the electrode would increase its resistivity in a temperature range in which batteries are usually used. This will lead to reduction of battery performance, such as load rate characteristics. If the temperature for manifestation of the PTC function exceeds 160° C., the inner temperature of a battery rises up to that temperature, which is unfavorable for safety. Accordingly, it is desirable that the electron conductive material 9 be designed to manifest the PTC function at a temperature ranging from 90° to 160° C.

Since the temperature at which the PTC function is activated is dependent on the melting point of the resin or crystalline resin, the resin or crystalline resin is selected from those having a melting point within a range of from 90° to 160° C.

The resistivity of the electrode in its normal state, i.e., the state before the PTC function is activated, can be controlled by varying the proportion of the electron conductive material 9 in the whole positive electrode active material layer 6. It is preferred that the electron conductive material 9 be used in a proportion of from 6 to 15 parts by weight per 100 parts by weight of the active material.

The proportion of the conductive filler in the electron conductive material 9 is preferably in a range of from 40 to 70 parts by weight, which is preferred for increasing the rate of change of electrode resistivity in case of a temperature rise while minimizing the resistivity of the electrode in its normal state and also for obtaining an increased discharge capacity from the battery.

The positive electrode active material 8 includes complex oxides comprising lithium and a transition metal, such as cobalt, manganese or nickel, chalcogenides containing lithium or complex compounds thereof, and these complex oxides, chalcogenides or complex oxides added with a dopant element, and various others in conformity with the type of batteries.

The negative electrode active material layer 7, being formed on a negative electrode current collector 5 made of a metal film (e.g., a copper film), is made up of a negative electrode active material, such as carbon particles, bound with a binder. The active materials which can be used in the negative electrode active material layer 7 are selected from those capable of lithium ion intercalation and disintercalation, such as carbonaceous materials, and other various materials in conformity to the type of the battery.

Any metal stable in the inside of a battery can be used as a positive electrode current collector 2 and a negative electrode current collector 5. Aluminum is preferred as the positive electrode current collector 2, and copper is preferred as the negative electrode current collector 5. The form of the current collectors 2 and 5 can be any of foil, net, expanded metal, etc. Those having a large surface area, such as net or expanded metal, are preferred for securing joint strength to the active material layers 3 and 6 and for facilitating impregnation with an electrolytic solution after joining.

Any insulating material that can hold an electrolytic solution and has sufficient strength, such as porous film, net, nonwoven fabric, or the like, can be used as the separator 3. From the standpoint of adhesion and security, a porous film made of polypropylene, polyethylene, etc. is preferably used. Some of fluorine resins, if used as a separator, need a plasma treatment to secure adhesiveness. Additionally, an ion-conducting solid polymer or gel polymer may be used as a separator.

The electrolytic solution which can be used includes solutions of an electrolyte, such as $LiPF_6$, $LiClO_4$, $LiBF_4$, $LiCF_3SO_3$, $LiN(CF_3SO_2)_2$, and $LiC(CF_3SO_2)_3$, in a solvent, such as an ether solvent, e.g., dimethoxyethane, diethoxyethane, dimethyl ether, and diethyl ether, an ester solvent, e.g., ethylene carbonate and propylene carbonate, and a mixture thereof; and other various kinds, selected in conformity with the type of the battery.

In the positive electrode 1 shown in FIG. 1, since the electron conductive material 9 contained in the positive electrode active material layer 6 exhibits PTC characteristics in itself, the active material layer 6 increases its resistivity upon the temperature of the positive electrode 1 exceeding over the temperature at which the PTC function of the electron conductive material 9 manifests itself. At the same time, the interfacial resistivity between the positive electrode 1 and the electrolyte layer also increases.

Accordingly, with the electrode having such characteristics applied to a battery (in this particular embodiment, applied to the positive electrode of a battery), in case where the current should increase due to a shortage outside or inside the battery and, as a result, the battery or electrode temperature should increase above a certain point, the positive electrode active material layer 6 increases its own resistivity, and the interfacial resistivity also increases. As a result, the current flowing inside the battery is controlled. Thus, a battery constructed by using the electrode will have markedly increased safety. That is, the safety of the battery is maintained even in case of abnormalities under severe conditions, such as a short-circuit, a back charge, an overcharge, and the like.

While the embodiment shown in FIG. 1 has been described with a particular case in which the positive electrode active material layer 6 comprises the positive electrode active material 8, the electron conductive material 9, and the binder 10, the invention is not deemed to be limited to this embodiment. For example, where the positive electrode active material 8 contained in the positive electrode active material layer 6 is of a material having low electron conductivity, the electron conductivity insufficiency of the positive electrode active material 6 could be compensated for by addition of a conducting agent to the positive electrode active material layer 6.

Further, the invention is not limited to the above disclosed structure in which the positive electrode 1, specifically the positive electrode active material layer 6, contains the conductive filler and the resin or crystalline resin. The same effects are to be produced when a battery is assembled by applying the above-described structure to the negative electrode 2.

In the following are described a process for preparing the positive electrode 1 shown in FIG. 1, a process for preparing the negative electrode 2, and a method of fabricating a battery having the positive electrode 1 and the negative electrode 2.

Process for preparing positive electrode

An electron conductive material whose volume resistivity is sufficiently low at room temperature but high at temperatures above a prescribed value between 90° C. and 160° C. (e.g., pellets prepared by kneading a finely particulate conductive filler and a resin or a crystalline resin in a prescribed mixing ratio) is used. The pellets are ground to obtain fine particles of the electron conductive material whose average particle size is 0.05 to 10 times that of a positive electrode active material.

Pulverization of an electron conductive material is desirably carried out by a method using compressed air or compressed inert gas (e.g., nitrogen or argon). Where it is desired to obtain particularly small particles, an ultrasonic stream of the above-mentioned gas is generated, and the electron conductive material particles are made to collide with each other or against a wall (not shown) in this gas stream (this mode is called a jet mill method).

Where there is no particular necessity of reducing the size of the electron conductive material particles more than necessity, a method for pulverizing the electron conductive material by rotating the electron conductive material in a ball mill instead of using compressed air (this method is called a ball mill method).

The resulting fine particles of the electron conductive material, a positive electrode active material (e.g., $LiCoO_2$), and a binder (e.g., PVDF) are dispersed in a dispersing medium (e.g., N-methylpyrrolidone, hereinafter abbreviated as NMP) to prepare a positive electrode active material paste.

The resulting paste is applied to a current collector substrate (e.g., a metal film of prescribed thickness) which will serve as a positive electrode current collector 4. After drying, the coating layer is pressed at a prescribed temperature under a prescribed planar pressure to form a positive electrode active material layer 6 having a desired thickness to obtain a positive electrode 1.

According to the above-described method of fabricating the positive electrode 1, since the pressing is carried out at a prescribed temperature under a prescribed planar pressure, the electron conductive material 9 and the active material (positive electrode active material 8) are brought into contact with improved adhesion thereby to reduce the electrode resistance in the normal state. In other words, the resistivity of the electrode prepared can be controlled by adjusting the temperature and pressure (planar pressure) in pressing the electrode. In particular, where the prescribed pressing temperature is set at the melting point of the resin or crystalline resin contained in the electron conductive material or thereabouts, the adhesion between the electron conductive material 9 and the active material 8 is further improved to further reduce the resistance of the electrode in its normal state.

While an embodiment in which a positive electrode active material paste is pressed at a prescribed temperature under a prescribed planar pressure has been explained, the positive electrode 1 can also be obtained by pressing a positive electrode active material paste under a prescribed planar pressure, followed by heating at a prescribed temperature (desirably the melting point or thereabouts).

A process for preparing a negative electrode 2 is described below.

Process for Preparing Negative Electrode:

A negative electrode active material paste is prepared by dispersing a negative electrode active material, such as mesophase carbon microbeads (hereinafter abbreviated as MCMB), and PVDF in NMP. The resulting paste is applied to a metal film of prescribed thickness which will serve as a negative electrode current collector to obtain a negative electrode 2 having a negative electrode active material layer 7.

A method of fabricating the battery according to the invention will be described.

Method of Fabricating Battery:

The positive and the negative electrodes prepared above are joined together with a separator interposed therebetween to obtain a battery having the positive and the negative electrodes. The battery thus obtained increases the resistivity of the positive electrode with an increase in temperature. In case a short-circuit should occur outside or inside the battery to raise the battery temperature, the battery suppresses an increase of the short-circuit current thereby securing improved safety.

While in the above-mentioned process the electron conductive material is present in the positive electrode 1, it can be incorporated into the negative electrode 2 or both of the positive electrode 1 and the negative electrode 2.

Specific examples of the invention will be given below, but it should be understood that the invention is not deemed to be limited thereto.

In Table 1 below are shown the composition (weight ratio) of the electron conductive material, active material, and binder used in the positive electrode, the average particle size of the electron conductive material, and five kinds of the active material different in average particle size which were used in Examples 1 to 4.

TABLE 1

| | Composition of Positive Electrode Active Material Layer (Electron Conductive Material/Active Material/Binder; weight ratio) | Average Particle Size of Electron Conductive Material ($\mu$m) | Average Particle Size of Active Material ($\mu$m) |
|---|---|---|---|
| Example 1 | 12/85/3 | 1 | 40, 20, 7, 2, 0.5 |
| Example 2 | 6/91/3 | 1 | 40, 20, 7, 2, 0.5 |
| Example 3 | 12/85/3 | 9 | 40, 20, 7, 2, 0.5 |
| Example 4 | 6/91/3 | 9 | 40, 20, 7, 2, 0.5 |

EXAMPLE 1

Preparation of Positive Electrode:

Pellets of an electron conductive material having a volume resistivity of 0.2 Ω·cm at room temperature and of 20 Ω·cm at 135° C. (a kneaded mixture of 60 parts by weight of finely particulate carbon black and 40 parts by weight of polyethylene) were finely ground by a jet mill method to prepare a finely particulate electron conductive material. The particle size of the resulting particulate electron conductive material was measured to find that the average particle size was about 1 μm.

Five kinds of a positive electrode active material different in average particle size as shown in Table 1 were prepared. Twelve parts by weight of the finely particulate electron conductive material, 85 parts by weight of the positive electrode active material ($LiCoO_2$), and 3 parts by weight of a binder (PVDF) were dispersed in NMP, a dispersing medium, to prepare five positive electrode active material pastes.

Each of the five kinds of pastes was applied to a 20 μm thick metal film (aluminum foil) serving as a positive electrode current collector 4 by a doctor blade coating method, dried at 80° C., and pressed at 80° C. under a planar pressure of 1 ton/cm$^2$ to obtain five kinds of positive electrodes 1 each having an about 100 μm thick positive electrode active material layer 6.

Preparation of Negative Electrode:

A negative electrode active material paste prepared by dispersing 90 parts by weight of mesophase carbon microbeads (hereinafter abbreviated as MCMB) and 10 parts by weight of PVDF in NMP was applied to 20 μm thick copper foil, a negative electrode current collector, by a doctor blade coating method to obtain a negative electrode 2 having a negative electrode active material layer 7.

Preparation of Battery:

The positive and the negative electrodes prepared above were joined together with a porous polypropylene sheet (Cell Guard #2400, produced by Hoechst) interposed therebetween to obtain five kinds of batteries having the positive and the negative electrodes.

Evaluation of Electrode and Battery:

The electrodes and the batteries of the invention were evaluated in accordance with the following methods.

Measurement of Resistivity of Electrode:

Aluminum foil was fusion bonded to both sides of the electrode. A voltage terminal and a current terminal of plus side were connected to the aluminum foil on one side, and those of minus side to the aluminum foil on the other side. The terminals were equipped with a heater. A constant current was made to flow through the device while heating the electrode at a rate of 5° C./min, and a reduction in voltage was measured to determine the resistivity (volume resistivity; Ω·cm).

Capacity Test:

The prepared positive and negative electrodes were both cut to a size of 14 mm×14 mm. A cut piece of the positive electrode and a cut piece of the negative electrode were joined together with a porous polypropylene sheet (Cell Guard #2400, produced by Hoechst) interposed therebetween to prepare a battery body. A current collecting tab was spot welded to each of the positive and the negative electrode current collectors, and the electrode body was put in a bag made of an aluminum laminate sheet. An electrolytic solution prepared by dissolving lithium hexafluorophosphate in a mixed solvent of ethylene carbonate and diethyl carbonate (1:1 by mole) in a concentration of 1.0 mol/dm$^3$ was poured into the bag, and the opening of the bag was heat-sealed to complete a battery. The resulting battery was subjected to a charge and discharge test at room temperature.

Short-circuit Test:

The prepared positive and negative electrodes were both cut to sizes of 50 mm×50 mm. A cut piece of the positive electrode and a cut piece of the negative electrode were joined with a porous polypropylene sheet (Cell Guard #2400, produced by Hoechst) interposed therebetween to prepare a unit electrode body. Ten unit electrode bodies were prepared and piled up, and a current collecting tab was connected to the end of every positive electrode current collector and every negative electrode current collector and spot-welded among the positive electrodes and among the negative electrodes to electrically connect the unit electrode bodies in parallel to form a laminated battery body.

The laminated battery body was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/dm$^3$ was put in the bag, and the opening of the bag was heat-sealed to complete a battery. Simultaneously, the current collecting tabs were fusion bonded to the aluminum laminate sheet and led outside the battery.

The resulting battery was charged at 8.0 mA up to 4.1 V at room temperature. After completion of charging, the battery temperature was gradually elevated from room temperature, and a short-circuit was caused between the positive and the negative electrodes at 140° C. The temperature rise at this time was measured.

Figure 2:
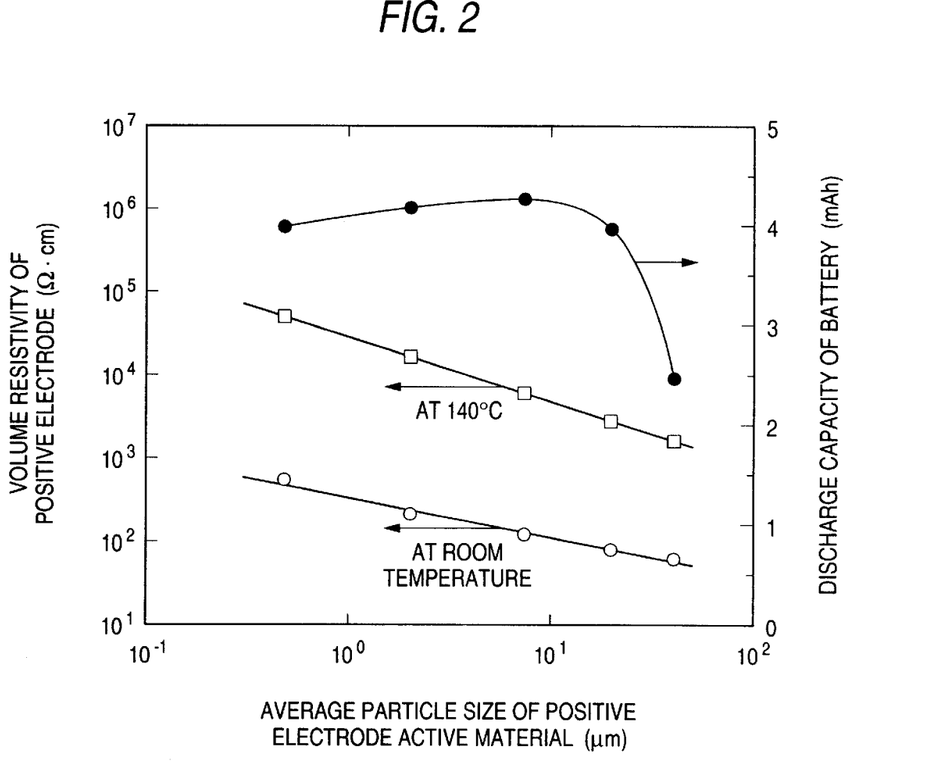
FIG. 2 is a graph showing the volume resistivity of the electrode at room temperature and 140° C. and the discharge capacity of the battery in Example 1.

FIG. 2 presents the characteristics of the electrodes and the batteries obtained in Example 1, showing the volume resistivity at room temperature and an elevated temperature (140°C.) and the discharge capacity at room temperature in relation to the average particle size of the active material. As shown in the Figure, the positive electrode increased its resistivity according as the average particle size of the active material decreased. As for the discharge capacity, the batteries whose active material had an average particle size up to 20 μm were satisfactory, whereas the battery of 40 μm suffered a great reduction. The resistivity at 140° C. was 30 to 1000 times that at room temperature. In the short-circuit test, every battery proved highly safe, showing a temperature rise of not greater than 10° C. over the set temperature and causing no thermal runaway.

EXAMPLE 2

Preparation of Positive Electrode:

In the same manner as in Example 1, pellets of an electron conductive material having a volume resistivity of 0.2 Ω·cm at room temperature and 20 Ω·cm at 135° C. were finely ground by a jet mill method. The particle size of the resulting particulate electron conductive material was measured to find that the average particle size was about 1 μm.

Five kinds of an active material different in average particle size as shown in Table 1 were prepared. Six parts by weight of the above prepared electron conductive material having an average particle size of 1 μm, 91 parts by weight of each of the five positive electrode active materials and 3 parts by weight of a binder were dispersed in NMP, a dispersing medium, to prepare five positive electrode active material pastes different in average particle size of the active material.

In the same manner as in Example 1, each paste was applied to a current collector to obtain five positive electrodes different in active material particle size. Batteries were prepared in the same manner as in Example 1 by using each of the resulting five positive electrodes and a negative electrode prepared in the same manner as in Example 1. The electrodes and the batteries thus prepared were evaluated in the same manner as in Example 1.

Figure 3:
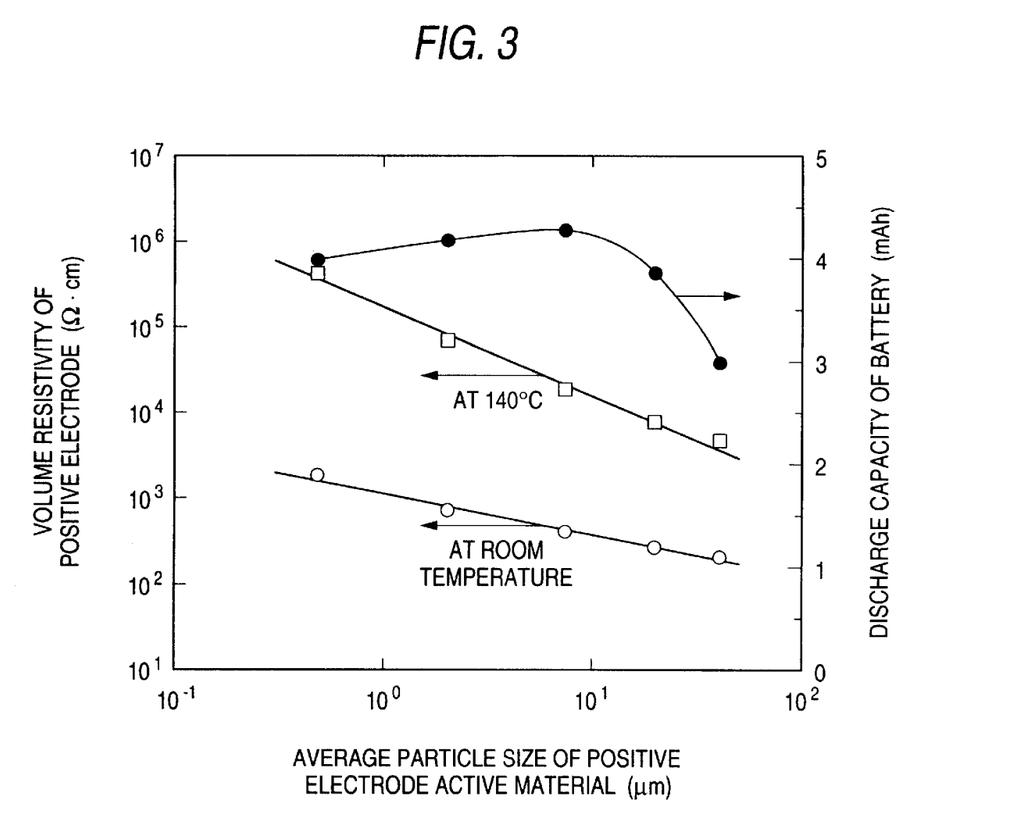
FIG. 3 is a graph showing the volume resistivity of the electrode at room temperature and 140° C. and the discharge capacity of the battery in Example 2.

FIG. 3 displays the characteristics of the electrodes and the batteries obtained in Example 2, showing the volume resistivity of the electrodes at room temperature and an elevated temperature of 140° C. and the discharge capacity of the batteries at room temperature in relation to the average particle size of the active material. Because of the lower concentration of the electron conductive material than in Example 1, the electrodes generally had an increased resistivity. Similarly to Example 1, the resistivity increased according as the average particle size of the active material was reduced. As for the discharge capacity, the batteries whose active material had an average particle size up to 20 μm were satisfactory, whereas the battery of 40 μm suffered a great reduction. The resistivity at 140° C. was higher than that at room temperature by one or more digits in every battery. In the short-circuit test, every battery proved highly safe, having a temperature rise of not greater than 10° C. over the set temperature and causing no thermal runaway.

EXAMPLE 3

Preparation of Positive Electrode:

A ball mill method, unlike the jet mill method used in Examples 1 and 2, was adopted. Pellets of an electron conductive material having a volume resistivity of 0.2 Ω·cm and 20 Ω·cm at 135° C. were ground by means of a ball mill. The particle size of the resulting powder was measured to find that the average particle size was about 9 μm.

Five kinds of an active material different in average particle size as shown in Table 1 were prepared. Twelve parts by weight of the above prepared electron conductive material having an average particle size of 9 μm, 91 parts by weight of each of the five positive electrode active materials, and 3 parts by weight of a binder were dispersed in NMP, a dispersing medium, to prepare five positive electrode active material pastes different in average particle size of the active material.

In the same manner as in Example 1, each paste was applied to a current collector to obtain five positive electrodes different in active material particle size. Batteries were prepared in the same manner as in Example 1 by using each of the resulting five positive electrodes and a negative electrode prepared in the same manner as in Example 1. The electrodes and the batteries thus obtained were evaluated in the same manner as in Example 1.

Figure 4:
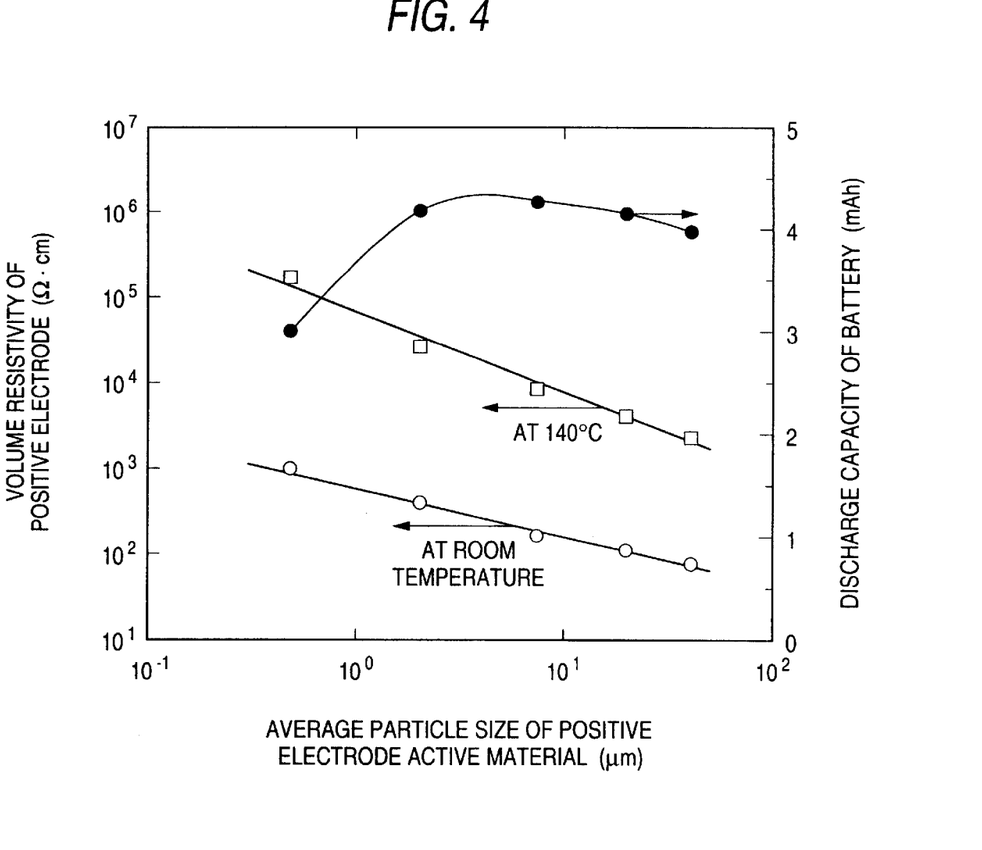
FIG. 4 is a graph showing the volume resistivity of the electrode at room temperature and 140° C. and the discharge capacity of the battery in Example 3.

FIG. 4 displays the characteristics of the electrodes and the batteries obtained in Example 3, showing the volume resistivity of the electrodes at room temperature and an elevated temperature of 140° C. and the discharge capacity of the batteries at room temperature in relation to the average particle size of the active material. The resistivity of the electrodes was somewhat higher than in Example 1 and lower than in Example 2. Similarly to Examples 1 and 2, the resistivity increased according as the average particle size of the active material was reduced. As for the discharge capacity, the batteries whose active material had an average particle size of from 2 up to 40 μm were satisfactory, whereas the battery of 0.5 μm suffered a great reduction. The resistivity at 140° C. was higher than that at room temperature by one or more digits in every battery. In the short-circuit test, every battery proved highly safe, having a temperature rise of not greater than 10° C. over the set temperature and causing no thermal runaway.

EXAMPLE 4

Preparation of Positive Electrode:

Pellets of an electron conductive material having a volume resistivity of 0.2 Ω·cm at room temperature and 20 Ω·cm at 135° C. were ground by a ball mill method in the same manner as in Example 3. The particle size of the ground electron conductive material was measured to find that the average particle size was about 9 μm.

Five kinds of an active material different in average particle size as shown in Table 1 were prepared. Six parts by weight of the above prepared electron conductive material having an average particle size of 9 μm, 91 parts by weight of each of the five positive electrode active materials having different particle sizes, and 3 parts by weight of a binder were dispersed in NMP, a dispersing medium, to prepare five positive electrode active material pastes different in average particle size of the active material.

In the same manner as in Example 1, batteries were prepared by using each of the resulting five positive electrodes and a negative electrode prepared in the same manner as in Example 1. The electrodes and the batteries thus obtained were evaluated in the same manner as in Example 1.

Figure 5:
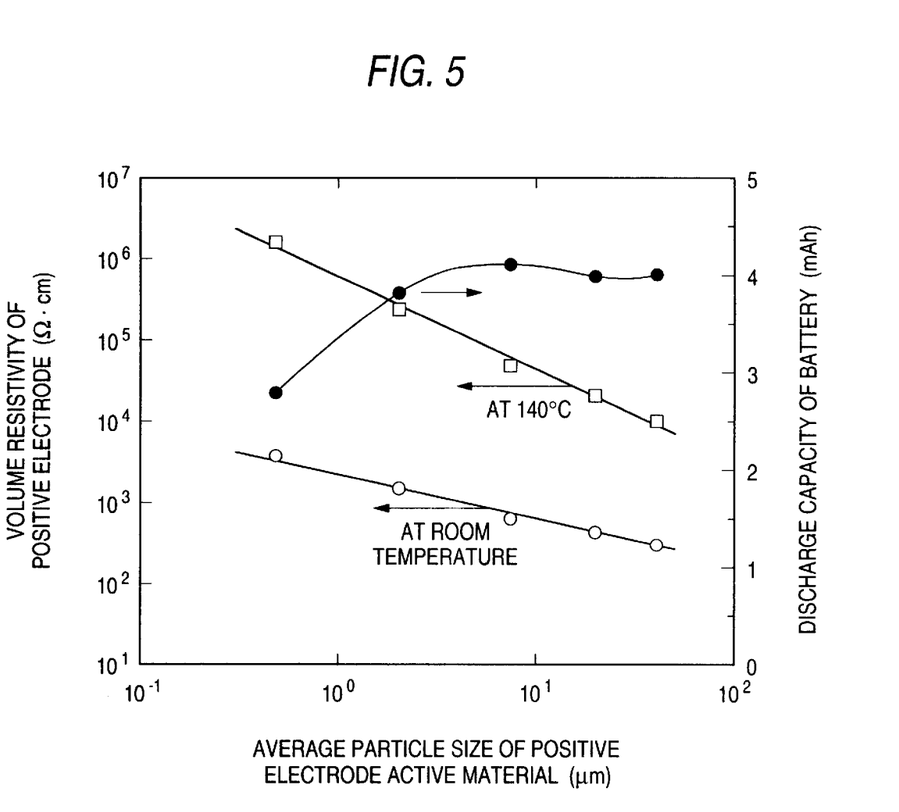
FIG. 5 is a graph showing the volume resistivity of the electrode at room temperature and 140° C. and the discharge capacity of the battery in Example 4.

FIG. 5 displays the characteristics of the electrodes and the batteries obtained in Example 4, showing the volume resistivity of the electrodes at room temperature and an elevated temperature of 140° C. and the discharge capacity of the batteries at room temperature in relation to the average particle size of the active material. The resistivity of the electrodes was higher than in other Examples. Similarly to other Examples, the resistivity increased according as the average particle size of the active material was reduced. Similarly to Example 3, it was only the battery having the smallest average particle size that showed a great reduction in discharge capacity. The resistivity at 140° C. was higher than that at room temperature by one or more digits in every battery. In the short-circuit test, every battery proved highly safe, having a temperature rise of not greater than 10° C. over the set temperature and causing no thermal runaway.

COMPARATIVE EXAMPLE 1

Preparation of Positive Electrode:

Artificial graphite KS-6 (produced by Lonza) was used as an electron conductive material. Five kinds of an active material different in average particle size as used in foregoing Examples 1 to 4 were used as an active material.

Six parts by weight of KS-6, 91 parts by weight of each of the five positive electrode active materials having different particle sizes, and 3 parts by weight of a binder were dispersed in NMP, a dispersing medium, to prepare five kinds of a positive electrode active material paste different in active material average particle size.

In the same manner as in Example 1, batteries were prepared by using each of the resulting five positive electrodes and a negative electrode prepared in the same manner as in Example 1. The electrodes and the batteries thus obtained were evaluated in the same manner as in Example 1.

Figure 6:
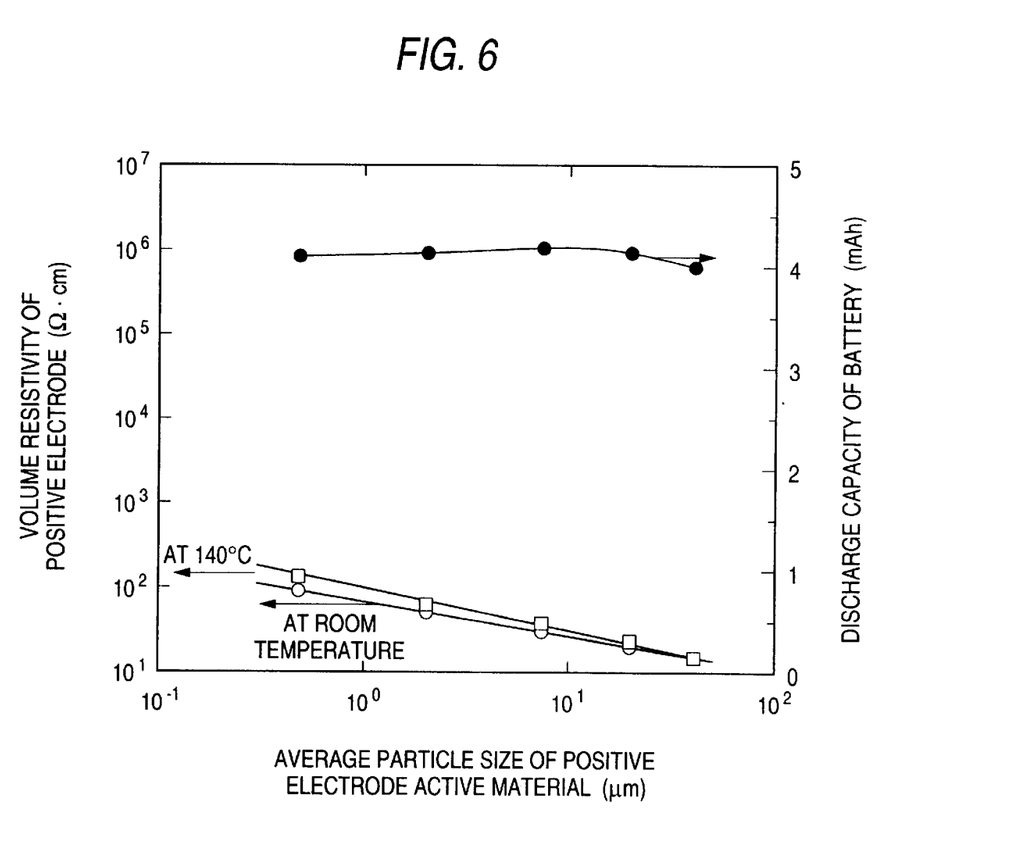
FIG. 6 is a graph showing the volume resistivity of the electrode at room temperature and 140° C. and the discharge capacity of the battery in Comparative Example.

FIG. 6 displays the characteristics of the electrodes and the batteries obtained in Comparative Example 1, showing the volume resistivity of the electrodes at room temperature and an elevated temperature of 140° C. and the discharge capacity of the batteries at room temperature in relation to the particle size of the active material. While the resistivity of the electrodes was lower than in Examples 1 through 4, the batteries were substantially equal in discharge capacity to the satisfactory batteries of Examples 1 to 4. Differing from Examples, every battery had a high discharge capacity, indicating that the particle size of the active material had small influences on the discharge capacity. Further, the resistivity at 140° C. was almost equal to that at room temperature in every battery. In the short-circuit test, all the batteries had difficulty in securing safety, showing a temperature increase by 60° C. or more over the set temperature to reach a temperature range of a thermal runaway.

It is thus understood that Comparative Example 1 achieves relatively high discharge capacities with any of the active materials having different particle sizes but involves a danger of a thermal runaway in a safety test. In Examples 1 to 4, on the other hand, every battery exhibited high safety although the particle size of the active material is limited in order to secure high discharge capacities. The electron conductive materials of the invention have now been proved effective in suppressing a thermal runaway.

Figure 7:
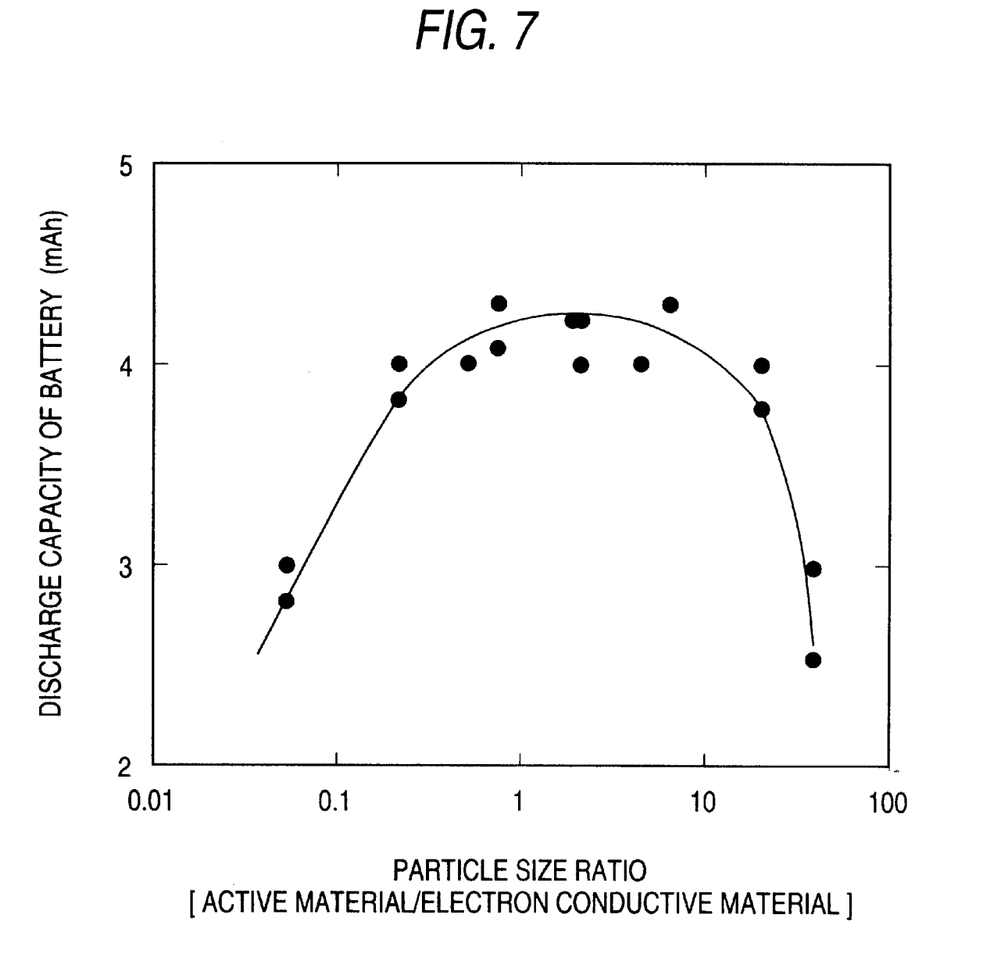
FIG. 7 is a graph showing the relationship of the discharge capacity of the batteries prepared in Examples 1 to 4 vs. the average particle size ratio of the active material to the electron conductive material.
Figure 8:
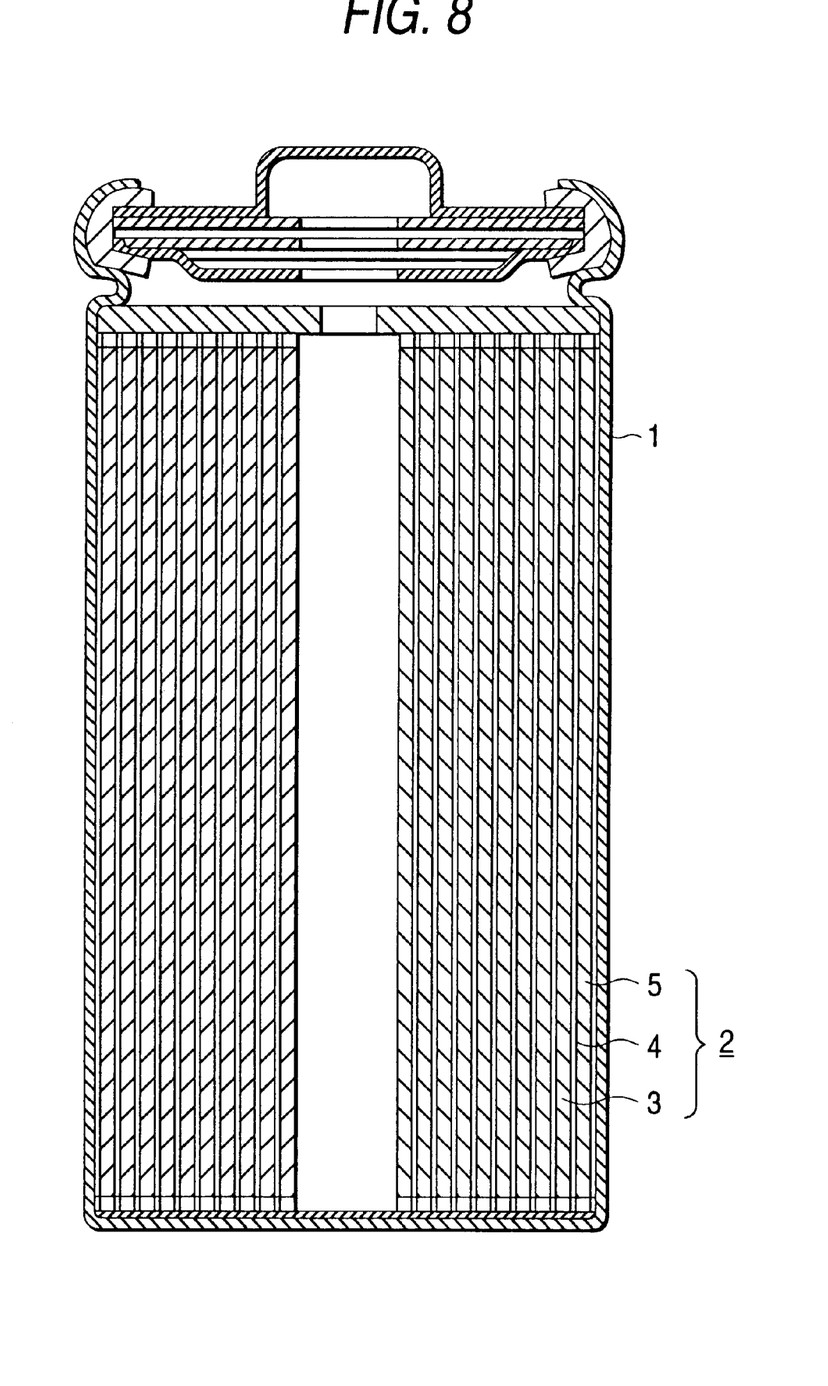
FIG. 8 is a view showing an example of a cylindrical battery.

FIG. 7 is the plots of discharge capacities of the batteries prepared in Examples 1 to 4 as an ordinate against the average particle size ratios of the active material to the electron conductive material as an abscissa. With the particle size ratio being from 0.1 to 20, the batteries had relatively high discharge capacities. If the ratio is 0.1 or smaller or 20 or higher, the discharge capacity shows a great reduction. Since the electron conductive materials used in the invention comprise, for example, carbon black and polyethylene, they have relatively low resistance to compression. Therefore, if the active material has an extremely small particle size as compared with the electron conductive material, it is likely that the small active material particles are embedded in the relatively soft electron conductive material on being pressed in the preparation of, for example, a positive electrode. In the batteries having low discharge capacities, it seems that the active material of their positive electrode has been covered in a large area ratio with the electron conductive material so that the resistance against a battery reaction may have increased.

On the other hand, if the active material has an extremely larger particle size than the electron conductive material, the number of the electron conductive material particles is extremely greater than that of the active material particles. In this case, the probability of the electron conductive material particles' coming into contact with each other will be increased. It can follow that the relatively soft electron conductive material particles of the invention undergo compressive deformation on being pressed, failing to maintain the pore structure (voids) adequate to a positive electrode reaction. Or, there is a possibility that the electron conductive material particles adhering to the surface of the active material undergo compressive deformation on being pressed. It can follow that the area ratio of the electron conductive material's covering the active material surface increases, incurring reduction in battery characteristics.

It has now been made clear that lithium secondary batteries having an electron conductive material comprising a conductive filler and a crystalline resin as claimed in the invention are of extremely high safety, being capable of preventing a thermal runaway, and exhibit satisfactory battery characteristics where the average particle size ratio of the active material to the electron conductive material falls within a range of from 0.1 to 20.

INDUSTRIAL APPLICABILITY

The battery and the method of fabricating the same according to the present invention are applicable to not only lithium ion secondary batteries of organic electrolytic solution type, solid electrolyte type or gel electrolyte type but primary batteries, such as a lithium-manganese dioxide battery, and other types of secondary batteries. They are also effective in primary and secondary batteries of aqueous solution type. Further, the battery shape is no object, and applications include primary and secondary batteries of laminated type, rolled type, button type, and the like.

What is claimed is:

1. A battery comprising:
an active material layer comprising an active material and electron conductive material particles in contact with the active material and an electrolyte layer joined to the active material layer, wherein the electron conductive material particles contain a conductive filler and a resin and is so constituted that its resistivity increases with temperature, and the average particle size of the active material is 0.1 to 20 times that of the electron conductive material particles.

2. The battery as set forth in claim 1, wherein the resin comprises a crystalline resin.

3. The battery as set forth in claim 1, wherein the electron conductive material particles have an average particle size ranging from 1 $\mu$m to 10 $\mu$m.

4. The battery as set forth in claim 1, wherein the weight ratio of the electron conductive material particles to the active material ranges from 0.06 to 0.15.

5. The battery as set forth in claim 1, wherein the resin has a melting point ranging from 90° C. to 160° C.

6. The battery as set forth in claim 5, wherein the resin has a melting point in the range of 90° to 160° C., and is a high-density polyethylene, a low density polyethylene, a polyurethane elastomer or a polyvinyl chloride.

7. The battery as set forth in claim 5, wherein the electron conductive material particles exhibit a positive temperature coefficient in said temperature range.

8. The battery as set forth in claim 1, wherein the proportion of the conductive filler in the electron conductive material particles is 40 to 70 parts by weight.

9. The battery as set forth in claim 1, wherein the conductive filler is a carbon material or a conductive non-oxide.

10. The battery as set forth in claim 7, wherein the conductive filler is a conductive non-oxide, which is a metal carbide, a metal nitride, a metal silicide or a metal boride.

11. The battery as set forth in claim 1, wherein the active material layer contains a conducting agent.

12. The battery as set forth in claim 1, wherein the conductive filler is lamp black, furnace black, acetylene black, graphite or carbon fiber.

13. A method of fabricating a battery, comprising:
(a) pulverizing an electron conductive material containing a conductive filler and a resin to prepare fine particles of the electron conductive material,
(b) dispersing the fine particles of the electron conductive material and the active material in a dispersing medium to prepare an active material paste,
(c) pressing the active material paste having being dried at a prescribed temperature under a prescribed pressure to form an electrode, and
(d) laying the resulting electrode and an electrolyte layer together,
thereby obtaining said battery comprising:
an active material layer comprising
said active material,
electron conductive material particles in contact with said active material, and
said electrolyte layer joined to said active material layer,
wherein said electron conductive material particles contain a conductive filler and a resin and is so constituted that its resistivity increases with temperature, and the average particle size of the active material is 0.1 to 20 times that of the electron conductive material particles.

14. The method of fabricating a battery as set forth in claim 9, wherein the resin comprises a crystalline resin.

* * * * *

UNITED STATES PATENT AND TRADEMARK OFFICE
CERTIFICATE OF CORRECTION

PATENT NO. : 6,677,074 B2  Page 1 of 1
DATED : January 13, 2004
INVENTOR(S) : Nishimura et al.

It is certified that error appears in the above-identified patent and that said Letters Patent is hereby corrected as shown below:

<u>Title page,</u>
Item [87], the PCT information is incorrect and should read:
-- [87]  PCT Pub. No.: WO99/67841
         PCT Pub. Date: Dec. 29, 1999 --

Signed and Sealed this

Second Day of March, 2004

JON W. DUDAS
*Acting Director of the United States Patent and Trademark Office*